United States Patent [19]

Hausler et al.

[11] Patent Number: 4,495,336

[45] Date of Patent: Jan. 22, 1985

[54] MERCAPTO-POLYCARBOXYLIC ACIDS

[75] Inventors: Rudolf H. Hausler; Neil E. S. Thompson, both of St. Louis, Mo.

[73] Assignee: Petrolite Corporation, St. Louis, Mo.

[21] Appl. No.: 385,351

[22] Filed: Jun. 7, 1982

[51] Int. Cl.$^3$ .................. C23F 11/04; E21B 43/22
[52] U.S. Cl. ............................ 252/8.55 E; 252/395; 422/12
[58] Field of Search ............. 252/8.55 E, 395; 422/12

[56]  References Cited

U.S. PATENT DOCUMENTS

| 3,640,736 | 2/1972 | Warner et al. | 252/395 |
| 3,762,873 | 10/1973 | Oude Alink | 422/12 |
| 4,020,000 | 4/1977 | Suen et al. | 252/8.55 E |
| 4,048,065 | 9/1977 | Suen et al. | 252/8.55 E |
| 4,086,181 | 4/1978 | Suen et al. | 252/8.55 E |
| 4,332,967 | 6/1982 | Thompson et al. | 564/162 |

FOREIGN PATENT DOCUMENTS 158278 12/1980 Japan ..................... 422/12

*Primary Examiner*—Christine M. Nucker
*Attorney, Agent, or Firm*—Sidney B. Ring; Leon Zitver

[57]  ABSTRACT

This invention relates to a sulfidic process of inhibiting corrosion which comprises heating a system with a sulfur-containing polycarboxylic acid or derivatives thereof having carboxylic groups attached to adjacent carbons.

20 Claims, No Drawings

MERCAPTO-POLYCARBOXYLIC ACIDS

This invention relates to a process of inhibiting corrosion which comprises heating a system with a sulfidic sulfur-containing polycarboxylic acid or derivative thereof having carboxylic groups attached to adjacent carbons.

In Ser. No. 161,198 filed June 19, 1980 now U.S. Pat. No. 4,332,967 there is described and claimed compositions which are mercapto adducts of unsaturated mono carboxylic acids such as acrylates, etc. and mono nitriles such as acrylonitrile, etc. and derivatives thereof which are useful as corrosion inhibitors.

We have now prepared, in a preferred embodiment, mercaptan adducts of unsaturated polycarboxylic acids such as maleic anhydrides and the corresponding acids and have found that such adducts are useful as corrosion inhibitors.

The reaction may be summarized as follows:

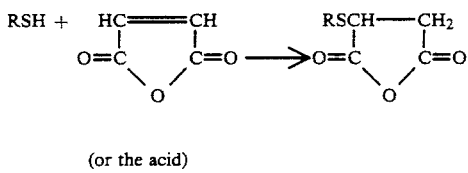

(or the acid)

The adducts of this invention can be converted to a wide number of derivatives. These include the following:
Acids
Salts
Esters
Amides
Aminoamides
Ester amides
Polyamides,
Polyester amides,
cyclic amidines
such as imidazolines, tetrahydropyrimidines, etc.,
polycyclic amidines
such as imidazolenes, tetrahydropyrimidines, etc. quaternaries and salts thereof.

Certain derivatives can be employed to convert water insoluble adducts of this invention to water soluble derivatives which are more effective in aqueous systems.

In general, the sulfidic group is introduced into the polycarboxylate by any suitable reaction. One method comprises adding a mercaptan across an unsaturated bond of the polycarboxylic acid according to the following equation:

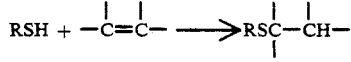

R is any group that does not interfere with the addition of the mercaptan across the unsaturated group, R may be, for example, a hydrocarbon group such as alkyl, aryl, aralkyl, cycloalkyl, etc., including substituted derivatives thereof.

The addition of mercaptan to the unsaturated group can be accomplished with or without catalysts. Preferred catalysts include bases such as hydroxides, alkoxides, tertiary amines, etc., or catalysts which can generate radicals.

The addition is carried out at any suitable temperature. Temperatures up to the decomposition points of reactants and products such as up to 200° C. or higher have been employed. In practice, one generally carries out the reaction by heating the reactants below 100° C., such as 80°-90° C. for a suitable period of time, such as a few hours.

The reaction time involved can vary widely depending on a wide variety of factors. For example, there is a relationship between time and temperature. In general, lower temperature demands longer times. In practice we employ times of from about 2 to 30 hours, such as 5 to 25 hours, and preferably 3 to 10 hours.

The sulfidic sulfur-containing maleic acid derivatives can also be prepared by various routes such as shown in equations (1) and (2):

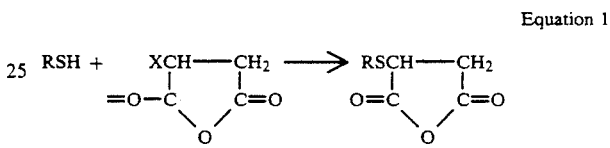

Equation 1 where X is halogen, Cl, Br, I, etc.

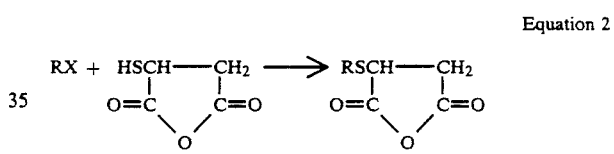

Equation 2 where X is halogen, Cl, Br, I.

The the products of these reactions can be further reacted with amines such as mono or polyamines. Where mono amines are reacted, salts and/or amides or combinations thereof are formed. Where polyamines are reacted, salts amides, cyclic amidines, etc., or combinations thereof, are formed. These are illustrated by the following equations:

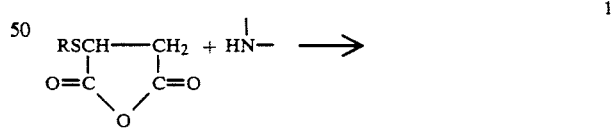

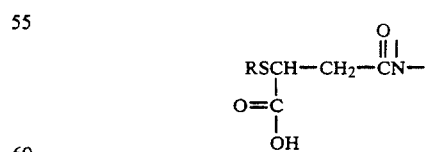

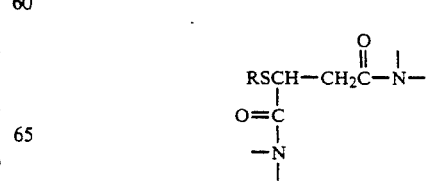

-continued $$RSCH-CH_2\overset{O}{\overset{\|}{C}}-\overset{|}{N}-, \text{ etc.}$$
$$O=C$$
$$\overset{|}{OH}.\overset{H}{N}-$$
$$|$$

Tertiary amines form salts rather than amides.

Where Polyamines are reacted the following reactions may take place:

$$RS-CH-CH_2 + NH_2(CH_2)_{2-3}\overset{H}{N}-R' \quad 2$$
$$O=C \quad C=O$$
$$\diagdown O \diagup$$

$$RS-CH-CH_2-\overset{O}{\overset{\|}{C}}\overset{H}{N}-(CH_2)_{2-3}\overset{H}{N}R' \text{ and/or}$$
$$O=C$$
$$\overset{|}{OH}$$

$$RSCH-CH_2-C\diagup\overset{N}{\diagdown}(CH_2)_{2-3}$$
$$O=C \qquad\qquad N$$
$$\overset{|}{OH} \qquad\qquad \overset{|}{R'}$$

The other carboxylic acid groups may also react to form salts, amides, cyclic amidines, etc., groups.

R' is H, alkyl, alkanol, aryl, aralkyl, cycloalkyl —A(N)$_n$R$_6$ where A is alkylene capable of forming a cyclic amidene ring and R$_6$ is H or a hydrocarbon group such as alkyl, etc.

Examples of polyamines employed herein are polyalkylene-polyamines, for example, of the formula $$NH_2\!-\!\!\left[\!-\!A\!-\!\overset{H}{N}\!-\!\right]_n\!\!-\!H$$

where n is an integer 1, 2, 3, 4, 5, 6, 7, 8, 9, 10, etc., and A is an alkylene group, provided that the polyamine contains an alkylene moiety of a cyclic-amidine forming group, i.e., a group having a $$NH_2(CH_2)_{2-3}\overset{H}{N}-$$

group.

One or more of the hydrogens on the CH$_2$ groups may be substituted for example, by such groups as alkyl groups, for example, methyl, ethyl, etc. Examples of A include $$\begin{array}{cccccc} CH_3 & CH_3 & CH_3 & CH_3 & CH_3 & CH_3 \\ | & | & | & | & | & | \\ -CH-CH-, & -CH-CH-CH-, & -CH-CH_2-CH-, \text{ etc.} \\ & & | & | & | \\ & & CH_3 & CH_3 & CH_3 \end{array}$$

Examples of polyamines include the following ethylene diamine, propylene diamine, diethylene triamine, dipropylene triamine, triethylene tetramine, tripropylene tetramine, tetraethylene pentamine, tetrapropylene pentamine, polyalkyleneimines, i.e. the higher molecular weight amines derived from alkyleneimine such as polyethyleneimines, polypropyleneimines, etc. Mixtures of the above polyamine amines and those polyamines containing both ethylene and propylene groups, for example $$NH_2CH_2CH_2\overset{H}{N}-CH_2CH_2\overset{\overset{CH_3}{|}}{N}-CH_2CH_2NH_2$$

$$NH_2CH_2CH_2\overset{H}{N}-(CH_2)_4-\overset{H}{N}-CH_2CH_2CH_2NH_2$$

etc., can be employed.

Other polyamines include those having more than 2 or 3 carbons between the amino-groups such as where the alkylene group has 4 or more carbons, such as NH$_2$—(CH$_2$)$_n$—NH$_2$ where n=4 or more, such as 4–10 carbon atoms, such as α–ω polyalkylene amines, such as NH$_2$(CH$_2$)$_6$NH$_2$, NH$_2$(CH$_2$)$_{10}$NH$_2$, etc., as well as polyamines which are not α–ω, such as NH$_2$(CH$_2$)$_4$CH(NH$_2$)—CH$_3$.

Some of the N-groups may be substituted (provided the polyamine is cyclic-amidine forming), for example, with hydrocarbon groups such as alkyl groups, etc.

In addition, to the basic form of these compositions, one can, in certain instances, prepare salts or quaternaries, either with organic or inorganic acids or quaternizing agents such as benzyl halides, alkyl halides, etc., dihalides such as alkylene dihalide, xylylene dihalides, alkylene ether dihalides such as (XCH$_2$CH$_2$)$_2$O, etc. Being basic the cyclic amidine unit readily forms salts, including di- and polysalts.

Examples of acids which can be employed to form salts include HCl, H$_2$SO$_4$, H$_3$PO$_4$, hydrocarbon sulfonic acids, acetic acid, oxalic acid, maleic acid, oleic acid, abietic acid, naphthenic acid, rosin, benzoic acid, phthalic acid, diglycollic acid, etc.

In one embodiment this invention relates to compositions containing both sulfur and amino groups. Specific compositions thereof are characterized by the presence of A. a sulfidic sulfur containing or a polysulfidic sulfur-containing group, and B. a nitrogen-containing group characterized by at least one of the following:

1. an amido or a polyamide group,
2. a cyclic amidine or a polycyclic amidine group.

The base catalyzed addition of an alkyl mercaptan across the double bond of maleic anhydride as described by Zienty et al and as shown in Equation 1 (J.Org.-Chem. Vol. 27, 3140, 3146 (1962)

$$R-SH + \overset{H}{\underset{\diagup}{C}}\!-\!\overset{H}{\underset{\diagdown}{C}} \quad \overset{NEt_3}{\longrightarrow} \quad R-S-\overset{H}{\underset{\diagup}{C}}\!-\!\overset{H_2}{\underset{\diagdown}{C}} \qquad \text{Equation 1}$$
$$\overset{\diagdown}{C}\overset{}{\diagup_{O}}\overset{}{\diagdown}C \qquad\qquad \overset{\diagdown}{C}\overset{}{\diagup_{O}}\overset{}{\diagdown}C$$
$$O\overset{\|}{\phantom{.}} \qquad \overset{\|}{\phantom{.}}O \qquad\qquad O\overset{\|}{\phantom{.}} \qquad \overset{\|}{\phantom{.}}O$$

The reaction proceeds quantitatively and the anhydride may then be easily opened to form amide, ester and thiol ester derivatives as shown in Equation 2:

$$R-S-\overset{H}{\underset{\diagup}{C}}\!-\!\overset{H_2}{\underset{\diagdown}{C}} \quad + \quad R^1XH \longrightarrow \qquad \text{Equation 2}$$
$$\overset{\diagdown}{C}\overset{}{\diagup_{O}}\overset{}{\diagdown}C$$
$$O\overset{\|}{\phantom{.}} \qquad \overset{\|}{\phantom{.}}O$$

Isomer A     Isomer B

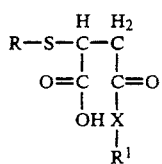 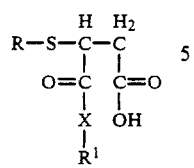

Where
R=alkyl
R¹=alkyl or H
X=S, O, NR

Diamides

A diamide derivative was made by first opening the anhydride with one equivalent of amine and then acylating the second equivalent of amine with the carboxylic acid formed by the ring opening in accord with Comprehensive Org. Chem. ed Barton & Ollis, Pergreme Press, N.Y., 1979, Vol. 2, p. 962.

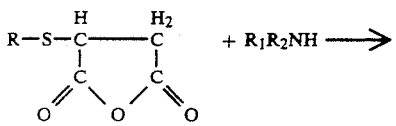 + $R_1R_2NH$ ⟶

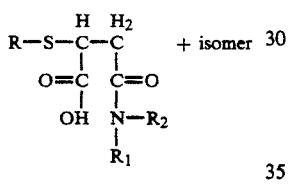 + isomer

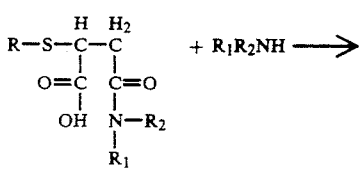 + $R_1R_2NH$ ⟶

(both isomers)

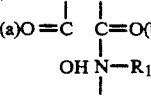

This reaction was found to work best with secondary amines as primary amines lead to a product mixture containing both diamide and imide.

Esters

Ring opening and esterification was carried out with primary alcohols. Acid catalysis was not found to be required for these reactions. In both cases, however, longer reaction times and higher temperatures than those required for amidation were used. If acid catalysts are used they must be removed from the product immediately to prevent de-esterification to the diacid. Esterification was attempted with tertiary butanol, however, product decomposition was too rapid to allow for testing of the compound. Both Isomer A and Isomer B were found in the product mixture, with the least sterically hindered Isomer A predominating.

A diester derivative was made by the acid catalyzed reaction of a two-fold excess of alcohol with anhydride. The equilibrium of this reaction was forced to the right by removal of water and solvent by distillation during the course of the reaction.

Thiol Esters

Alkyl mercaptans were found to form thiol esters when reacted with the anhydride and one equivalent of a base such as triethylamine. Thiol esters formed in this reaction are in the form of the amine salt of the acid. The acid form may be produced by acidifying the product and then washing thoroughly with water. Both forms of the product were used in corrosion testing. Isomer A was found to slightly predominate over Isomer B in the product mixture.

The following examples are presented by way of illustration and not of limitation.

TABLE I

OCTYLMERCAPTOSUCCINATE AMIDES

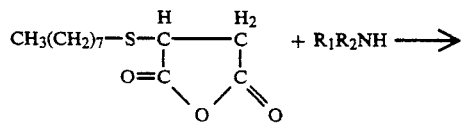 + $R_1R_2NH$ ⟶

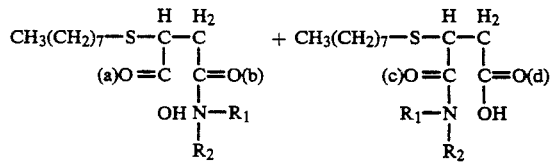

Isomer A     Isomer B

| Ex. | R | ¹³C nmr Data[a] Isomer A | Isomer B | Isomer Ratio A/B | Corrosion Data[b] A | C | Comments |
|---|---|---|---|---|---|---|---|
| 1 | $R_1$ = H | (a) 175.4 | (c) 170.1 | 50/50 | 6.0 | 4.0 | |
|   | $R_2$ = —C—(CH₃)₃ | (b) 174.8 | (d) 170.4 | | | | |
| 2 | $R_1$ = H | (a) 175.6 | (c) 171.0 | 50/50 | 1.0 | 0.80 | |
|   | $R_2$ = —CH₂CH₂CH₂CH₃ | (b) 174.1 | (d) 171.7 | | | | |

TABLE I-continued
OCTYLMERCAPTOSUCCINATE AMIDES

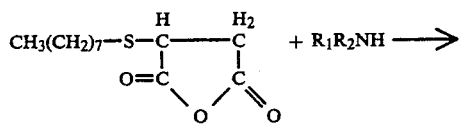  + $R_1R_2NH \longrightarrow$

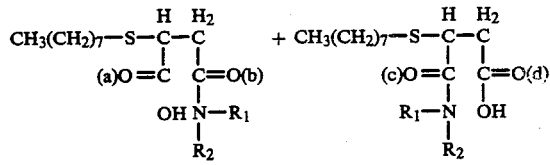

Isomer A                 Isomer B

| Ex. | R | $^{13}$C nmr Data$^a$ Isomer A | Isomer B | Isomer Ratio A/B | Corrosion Data$^b$ A | C | Comments |
|---|---|---|---|---|---|---|---|
| 3 | $R_1 = R_2 =$ cyclohexyl | (a) 175.8 (b) 174.8 | | 100% A | 8.0 | 6.0 | |
| 4 | $R_1 = H$ $R_2 = -(CH_2)_7-CH_3$ | (a) 175.2 (b) 174.1 | (c) 170.8 (d) 171.3 | 60/40 | 3.0 | 2.0 | |
| 5 | $R_1 + R_2 = -(CH_2)_5-CH_3$ | (a) 175.4 (b) 174.7 | (c) 168.6 (d) | 50/50 | 1.2 | 1.0 | |
| 6 | $R_1 = H$ $R_2 = -(CH_2)_3-N\begin{matrix}CH_3\\CH_3\end{matrix}$ | (a) 177.2 (b) 176.1 | (c) 171.4 (d) 172.6 | 60/40 | 3.2 | 2.6 | Primarily in the form of an amine salt |

Footnotes:
(a) Chemical shifts for C=O
(b) Corrosion rates in MPY at 24 hours; A = Anodic, C = Cathodic
Corrosion tests were carried out at ambient temperatures in a 2% sodium chloride solution saturated with $CO_2$. The blank corrosion rate under these conditions is 100 mpy. The inhibitor was injected after the electrodes were allowed to corrode for two hours. Inhibitor concentration in solution was 20 ppm. Corrosion data was taken 24 hours after inhibitor injection and was measured in MPY.

TABLE II
THIOSUCCINATE ESTERS

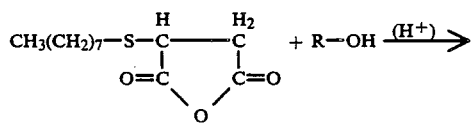  + $R-OH \xrightarrow{(H^+)}$

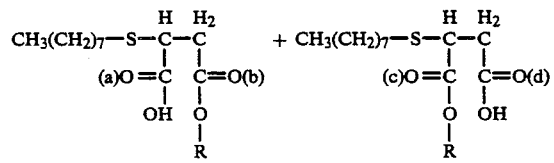

Isomer A                 Isomer B

| Ex. | R | $^{13}$C nmr Data$^a$ Isomer A | Isomer B | Isomer Ratio A/B | Corrosion Data$^b$ A | C | Comments |
|---|---|---|---|---|---|---|---|
| 1 | $R = CH_2(CH_2)_2-CH_3$ | (a) 175.6 (b) 174.5 | (c) 170.6 (d) 171.8 | 60/40 | 3.0 | 2.5 | Acid catalyzed |

TABLE II-continued
THIOSUCCINATE ESTERS $$CH_3(CH_2)_7-S-\underset{O=C}{\overset{H}{C}}-\underset{C=O}{\overset{H_2}{C}} + R-OH \xrightarrow{(H^+)}$$

$$CH_3(CH_2)_7-S-\underset{(a)O=C}{\overset{H}{C}}-\underset{\underset{O}{C=O(b)}}{\overset{H_2}{C}} + CH_3(CH_2)_7-S-\underset{(c)O=C}{\overset{H}{C}}-\underset{\underset{OH}{C=O(d)}}{\overset{H_2}{C}}$$
$$\qquad\qquad\qquad OH\quad O\qquad\qquad\qquad\qquad\qquad O$$
$$\qquad\qquad\qquad\qquad\quad R\qquad\qquad\qquad\qquad\qquad\qquad R$$

Isomer A          Isomer B

| Ex. | R | $^{13}$C nmr Data$^a$ Isomer A | Isomer B | Isomer Ratio A/B | Corrosion Data$^b$ A | C | Comments |
|---|---|---|---|---|---|---|---|
| 2 | R = -C(H)(H)-C(H)(CH_3)(CH_3) | (a) 175.8 | (c) 170.8 | 70/30 | 0.50 | 0.54 | Acid catalyzed |
| 3 | R = —CH$_2$CH$_2$—SH | (a) 175.1 (b) 174.1 | (c) 170.4 (d) 171.4 | 70/30 | 2.0 | 1.8 | |
| 4 | R = —CH$_2$CH$_2$—SH | (a) 175.0 | (c) 171.3 | 90/10 | 1.9 | 1.8 | 1 equivalent of triethylamine used in synthesis producing amine salt of acid - very rapid inhibition |
| 5 | R = —(CH$_2$)$_5$—CH$_3$ | (a) 174.8 (b) 173.9 | (c) 171.0 (d) 172.2 | 70/30 | 0.80 | 0.84 | Decomposed within 12 days |

Footnotes:
(a) Chemical Shifts of C=O
(b) Corrosion rate in MPY at 24 hours; A = Anodic; C = Cathodic
*Triethylamine salt

TABLE III
ALKYLMERCAPTOSUCCINIC THIOLESTERS $$CH_3(CH_2)_7-S-\underset{O=C}{\overset{H}{C}}-\underset{C=O}{\overset{H_2}{C}} + R-SH \xrightarrow[\text{Reflux}]{1\text{ eq NEt}_3}$$
$$\qquad\qquad\qquad\qquad O$$

$$CH_3(CH_2)_7-S-\underset{(a)O=C}{\overset{H}{C}}-\underset{\underset{S}{C=O(b)}}{\overset{H_2}{C}} + CH_3(CH_2)_7-S-\underset{(c)O=C}{\overset{H}{C}}-\underset{\underset{OH}{C=O(d)}}{\overset{H_2}{C}}$$
$$\qquad\qquad\qquad OH\quad S\qquad\qquad\qquad\qquad\qquad S$$
$$\qquad\qquad\qquad\qquad\quad R\qquad\qquad\qquad\qquad\qquad\qquad R$$

Isomer A          Isomer B

| Ex. | R | $^{13}$C nmr Data$^a$ Isomer A | Isomer B | Isomer Ratio A/B | Corrosion Data$^b$ A | C | Comments |
|---|---|---|---|---|---|---|---|
| 1 | R = —(CH$_2$)$_7$—CH$_3$ | (a) 173.9 (b) 198.3 | (c) 196.7 (d) 174.9 | 60/40 | 10.0 | 8.0 | Amine salt form |
| 2 | R = —(CH$_2$)$_7$—CH$_3$ | (a) 176.4 (b) 197.9 | (c) 196.4 (d) 177.4 | 60/40 | 3.6 | 2.8 | Acid form |
| 3 | R = —(CH$_2$)$_{11}$—CH$_3$ | (a) 173.8 (b) 197.5 | (c) 196.0 (d) 174.7 | 60/40 | 5.6 | 3.8 | Amine salt form |
| 4 | R = —(CH$_2$)$_{11}$—CH$_3$ | (a) 176.4 (b) 197.5 | (c) 195.8 (d) 177.9 | 60/40 | 0.66 | 0.54 | Acid form |
| 5 | R = —(CH$_2$)$_3$—CH$_3$ | (a) 173.9 (b) 197.8 | (c) 196.2 (d) 174.8 | 60/40 | 1.0 | 0.80 | Amine salt form |
| 6 | R = —(CH$_2$)$_3$—CH$_3$ | (a) 176.6 | (c) 196.0 | 60/40 | 0.90 | 0.80 | Acid form |

TABLE III-continued
ALKYLMERCAPTOSUCCINIC THIOLESTERS

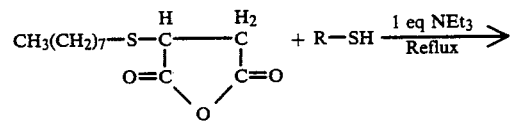

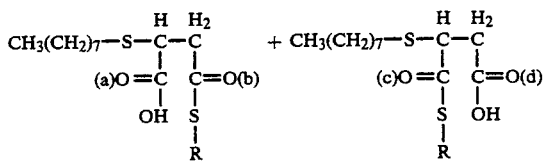

Isomer A      Isomer B

| Ex. | R | ¹³C nmr Data[a] Isomer A | Isomer B | Isomer Ratio A/B | Corrosion Data[b] A | C | Comments |
|-----|---|-----|-----|-----|-----|-----|-----|
|  |  | (b) 197.5 | (d) 177.7 |  |  |  |  |

Footnotes:
(a) Chemical shifts for C=O
(b) Corrosion rates in MPY at 24 hours; A = Anodic; C = Cathodic

TABLE IV
THIOESTER BASED ON DODECYLMERCAPTOSUCCINIC ACID (1) 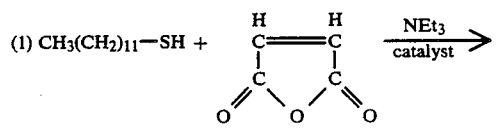

(2) 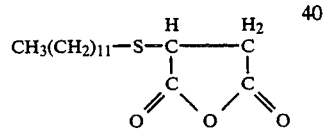

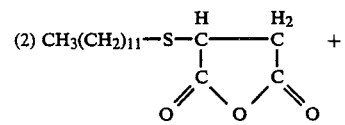

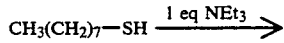

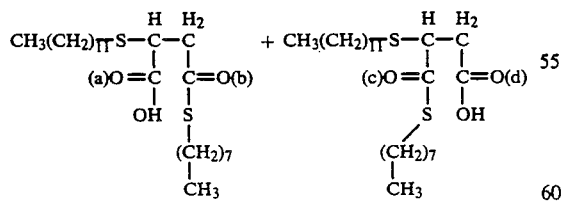

Isomer A      Isomer B

| Ex. | ¹³C nmr Data Isomer A | Isomer B | Isomer Ratio A/B | Corrosion Data A | C | Comments |
|-----|-----|-----|-----|-----|-----|-----|
| 1 | (a) 173.9 | (c) 196.1 | 60/40 | 30.0 | 24.0 | Amine salt form |
|   | (b) 197.6 | (d) 174.8 |  |  |  |  |
| 2 | (a) 175.6 | (c) 196.1 | 60/40 | 4.0 | 3.0 | Acid form |

TABLE IV-continued
THIOESTER BASED ON DODECYLMERCAPTOSUCCINIC ACID (1) 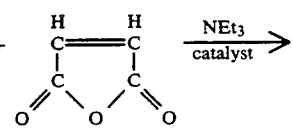

(2) 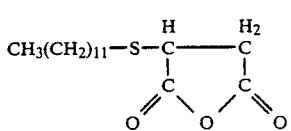

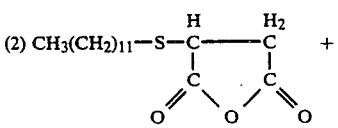

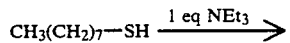

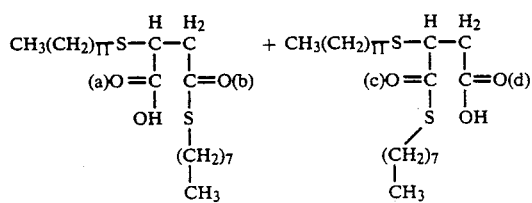

Isomer A      Isomer B

| Ex. | ¹³C nmr Data Isomer A | Isomer B | Isomer Ratio A/B | Corrosion Data A | C | Comments |
|-----|-----|-----|-----|-----|-----|-----|
|  | (b) 197.6 | (d) 176.5 |  |  |  |  |

TABLE V

MISCELLANEOUS SUCCINIC AND MALEIC ACID DERIVATIVES

| Ex. | Structure | $^{13}$C nmr Data | Corrosion Data A | Corrosion Data B | Comments |
|---|---|---|---|---|---|
| 1 | CH$_3$(CH$_2$)$_7$—S—CH—CH$_2$ with C(b)O—O—CO(a) (anhydride) | (a) 169.1 (b) 174.4 | 1.4 | 1.2 | Hydrolyzes during the course of the corrosion test so protection due to the diacid form |
| 2 | CH$_3$(CH$_2$)$_7$—S—CH—CH$_2$ with (a)O=C and C=O(b), each esterified with OCH$_2$(CH$_2$)$_4$CH$_3$ | (a) 171.7 (b) 170.5 (c) 64.9 (d) 62.9 | 58–60.0 | 38.0 | Protection improved with reduction of excess hexanol |
| 3 | CH$_3$(CH$_2$)$_7$—S—CH—CH$_2$ with (a)O=C and C=O(b), each bonded to N-piperidinyl | (a) 169.5 (b) 177.3 (c) 25.3 (d) 26.8 (e) 44.41(m) | 20.0 | 18.0 | |
| 4 | CH$_3$(CH$_2$)$_7$—S—CH—CH$_2$ with (a)O=C and C=O(b), bridged by N—(CH$_2$)$_3$CH$_3$ | (a) 176.7 (b) 174.8 | 8.0 | 6.6 | |

Other polycarboxylic acids can also be employed to prepare the mercapto adducts. For example, mercapto group can be added to unsaturated cyclic aliphatic carboxylic acids such as the following

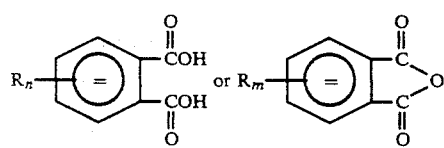

where R is H or a substituted group such as alkyl, etc. and where

is a cyclohexyl radical having at least one unsaturated group on the ring capable of reacting with a mercapto group, i.e. = indicates ring unsaturated, for example

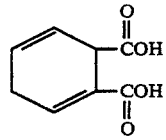

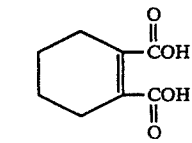

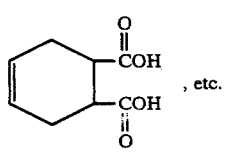

including the anhydrides, etc. or mixtures thereof

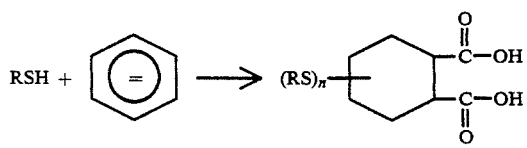

or the anhydride.

USE AS CORROSION INHIBITORS

This phase of this invention relates to the use of these compositions in inhibiting the corrosion of metals, most particularly iron, steel and ferrous alloys. These compositions can be used in a wider variety of applications and systems where iron, steel and ferrous alloys are affected by corrosion. They may be employed for inhibiting corrosion in processes which require this protective or passivating coating as by dissolution in the medium which comes in contact with the metal. They can be used in preventing atmospheric corrosion, underwater corrosion, corrosion in steam and hot water systems, corrosion in chemical industries, underground corrosion, etc.

The corrosion inhibitors contemplated herein find special utility in the prevention of corrosion of pipe or equipment which is in contact with a corrosive oil-containing medium, as, for example, in oil wells producing corrosive oil or oil-brine mixtures, in refineries, and the like. These inhibitors may, however, be used in other systems or applications. They appear to possess properties which impart to metals resistance to attack by a variety of corrosive agents, such as brines, weak inorganic acids, organic acids, $CO_2$, $H_2S$, etc.

The method of carrying out this process is relatively simple in principle. The corrosion preventive reagent is incorporated by dissolution and/or dispersion into the liquid corrosive medium in small amounts and is thus kept in contact with the metal surface to be protected. Alternatively, the corrosion inhibitor may be applied first to the metal surface, either as is, or as a solution in some carrier liquid or paste. Continuous application, as in the corrosive solution, is the preferred method, however.

The present process finds particular utility in the protection of metal equipment of oil and gas wells, especially those containing or producing an acidic constituent such as $H_2S$, $CO_2$, organic acids and the like. For the protection of such wells, the reagent, either undiluted or incorporated in a suitable solvent, is fed down the annulus of the well between the casing and producing tubing where it becomes commingled with the fluid in the well and is pumped or flowed from the well with these fluids, thus contacting the inner wall of the casing, the outer and inner wall of tubing, and the inner surface of all wellhead fittings, connections and flow lines handling the corrosive fluid.

Where the inhibitor composition is a liquid, it is conventionally fed into the well annulus by means of a motor driven chemical injector pump, or it may be dumped periodically (e.g., once every day or two) into the annulus by means of so-called "boll weevil" device or similar arrangement. Where the inhibitor is a solid, it may be dropped into the well as a solid lump or stick, it may be blown in as a powder with gas, or it may be washed in with a small stream of the well fluids or other liquid. Where there is gas pressure on the casing, it is necessary, of course, to employ any of these treating methods through a pressure equalizing chamber equipped to allow introduction of reagent into the chamber, equalization of pressure between chamber and casing, and travel of reagent from chamber to well casing.

Occasionally, oil and gas wells are completed in such a manner that there is no opening between the annulus and the bottom of the tubing or pump. The results, for example, when the tubing is surrounding at some point by a packing held by the casing or earth formation below the casing. In such wells the reagent may be introduced into the tubing through a pressure equalizing vessel, after stopping the flow of fluids. After being so treated, the well should be left closed in for a period of time sufficient to permit the reagent to drop to the bottom of the well.

For injection into the well annulus, the corrosion inhibitor is usually employed as a solution in a suitable solvent. The selection of solvent will depend much upon the exact reagent being used and its solubility characteristics.

For treating wells with packed-off tubing, the use of solid "sticks" or plugs of inhibitor is especially convenient. These may be prepared by blending the inhibitor with a mineral wax, asphalt or resin in a proportion sufficient to give a moderately hard and high-melting solid which can be handled and fed into the well conveniently.

The protective action of the herein described reagents appears to be maintained for an appreciable time after treatment ceases, but eventually is lost unless another application is made.

For the protection of gas wells and gas-condensate wells, the amount of corrosion inhibitor required will be within range of one-half to 3 lbs. per million cubic feet of gas produced, depending upon the amounts and compositions of corrosive agents in the gas and the amount of liquid hydrocarbon and water produced. However, in no case does the amount of inhibitor required appear to be stoichiometrically related to the amount of acids produced by a well, since protection is obtained with much less corrosion inhibitor than usually would be required for neutralization of the acids produced.

These compositions are particularly effective in the prevention of corrosion in systems containing a corrosive aqueous medium, and most particularly in systems containing brines.

These compositions can also be used in the prevention of corrosion in the secondary recovery of petroleum by water flooding and in the disposal of waste water and brine from oil and gas wells. Still more particularly, they can be used in a process of preventing corrosion in water flooding and in the disposal of waste water and brine from oil and gas wells which is characterized by injecting into an underground formation an aqueous solution containing minor amounts of the compositions of this invention, in sufficient amounts to prevent the corrosion of metals employed in such operation.

When an oil well ceases to flow by the natural pressure in the formation and/or substantial quantities of oil can no longer be obtained by the usual pumping methods, various processes are sometimes used for the treatment of the oil-bearing formation in order to increase the flow of oil. These processes are usually described as secondary recovyry processes. One such process which is used quite frequently is the water flooding process wherein water is pumped under pressure into what is called an "injection well" and oil, along with quantities of water, that have been displaced from the formation, are pumped out of an adjacent well usually referred to as a "producing well." The oil which is pumped from the producing well is then separated from the water that has been pumped from the producing well and the water is pumped to a storage reservoir from which it can again be pumped into the injection well. Supplementary water from other sources may also be used in conjunction with the produced water. When the storage reservoir is open to the atmosphere and the oil is subject to aeration this type of water flooding system is referred to herein as an "open water flooding system." If the water is recirculated in a closed system without substantial aeration, the secondary recovery method is referred to herein as a "closed water flooding system."

Because of the corrosive nature of oil field brines, to economically produce oil by water flooding, it is necessary to prevent or reduce corrosion since corrosion increases the cost thereof by making it necessary to repair and replace such equipment at frequent intervals.

We have now discovered a method of preventing corrosion in systems containing a corrosive aqueous media, and most particularly in systems containing brines, which is characterized by employing the compounds described herein.

We have also discovered an improved process of protecting from corrosion metallic equipment employed in secondary oil recovery by water flooding such as injection wells, transmission lines, filters, meters, storage tanks, and other metallic implements employed therein and particularly those containing iron, steel, and ferrous alloys, such process being characterized by employing in water flood operation an aqueous solution of the compositions of this invention.

The invention, then is particularly concerned with preventing corrosion in a water flooding process characterized by the flooding medium, containing an aqueous or an oil field brine solution of these compositions.

In many oil fields large volumes of water are produced and must be disposed of where water flooding operations are not in use or where water flooding operations cannot handle the amount of produced water. Most States have laws restricting pollution of streams and land with produced waters, and oil producers must then find some method of disposing of the waste produced salt water. In many instances therefore, the salt water is disposed of by injecting the water into permeable low pressure strata below the fresh water level. The formation into which the water is injected is not the oil producing formation and this type of disposal is defined as salt water disposal or waste water disposal. The problems of corrosion of equipment are analogous to those encountered in the secondary recovery operation by water flooding.

The compositions of this invention can also be used in such water disposal wells thus providing a simple and economical method of solving the corrosion problems encountered in disposing of unwanted water.

Water flood and waste disposal operations are too well known to require further elaboration. In essence, in the present process, the flooding operation is effected in the conventional manner except that the flooding medium contains a minor amount of these compositions, sufficient to prevent corrosion.

While the flooding medium employed in accordance with the present invention contains water or oil field brine and the compounds of this invention, the medium may also contain other materials. For example, the flooding medium may also contain other agents such as surface active agents or detergents which aid in wetting throughout the system and also promote the desorption of residual oil from the formation, sequestering agents which prevent the deposition of calcium and/or magnesium compounds in the interstices of the formation, bactericides which prevent the formation from becoming plugged through bacterial growth, tracers, etc. Similarly, they may be employed in conjunction with any of the operating techniques commonly employed in water flooding and water disposal processes, for example five spot flooding, peripheral flooding, etc. and in conjunction with other secondary recovery methods.

The concentration of the corrosion inhibitors of this invention will vary widely depending on the particular composition, the particular system, etc. Concentrations of at least about 5 p.p.m., such as about 10 to 10,000 p.p.m. for example about 25 to 5,000 p.p.m., advantageously about 50 to 1,000 p.p.m., preferably about 75–250 p.p.m. may be employed. Larger amounts can also be employed such as 1.5–5.0% although there is generally no commercial advantage in so doing.

For example, since the success of a water flooding operation manifestly depends upon its total cost being less than the value of the additional oil recovered from the oil reservoir, it is quite important to use as little as possible of these compounds consistent with optimum corrosion inhibition. Since these compounds are themselves inexpensive and are used in low concentrations, they enhance the success of a flood operation by lowering the cost thereof.

By varying the constituents of the composition, the compounds of this invention can be made more oil or more water soluble, depending on whether the composition is to be employed in oil or water systems.

USE IN ACID SYSTEMS

The compositions of this invention can also be employed as corrosion inhibitors for acid systems, for example as illustrated by the pickling of ferrous metals, the treatment of calcareous earth formations, etc., as described in the following sections.

USE AS PICKLING INHIBITORS

This phase of the invention relates to pickling. More particularly, the invention is directed to a pickling composition and to a method of pickling ferrous metal. The term "ferrous metal" as used herein refers to iron, iron alloys and steel.

To prepare ferrous metal sheet, strip, etc., for subsequent processing, it is frequently desirable to remove oxide coating, formed during manufacturing, from the surface. The presence of oxide coating, referred to as "scale" is objectionable when the material is to undergo subsequent processing. Thus, for example, oxide scale must be removed and a clean surface provided if satisfactory results are to be obtained from hot rolled sheet and strip in any operation involving deformation of the product. Similarly, steel prepared for drawing must possess a clean surface and removal of the oxide scale therefrom is essential since the scale tends to shorten drawing-die life as well as destroy the surface smoothness of the finished product. Oxide removal from sheet or strip is also necessary prior to coating operations to permit proper alloying or adherence of the coating to the ferrous metal strip or sheet. Prior to cold reduction, it is necessary that the oxide formed during hot rolling be completely removed to preclude surface irregularities and enable uniform reduction of the work.

The chemical process used to remove oxide from metal surfaces is referred to as "pickling." Typical pickling processes involve the use of aqueous acid solutions, usually inorganic acids, into which the metal article is immersed. The acid solution reacts with the oxides to form water and a salt of the acid. A common problem in this process is "over-pickling" which is a condition resulting when the ferrous metal remains in the pickling solution after the oxide scale is removed from the surface and the pickling solution reacts with the ferrous base metal. An additional difficulty in pickling results from the liberated hydrogen being absorbed by the base metal and causing hydrogen embrittlement. To overcome the aforementioned problems in pickling, it has been customary to add corrosion inhibitors to the pickling solution.

The present invention avoids the above-described problems in pickling ferrous metal articles and provides a pickling composition which minimizes corrosion, overpickling and hydrogen embrittlement. Thus the pickling inhibitors described herein not only prevent excessive dissolution of the ferrous base metal but effectively limit the amount of hydrogen absorption thereby during pickling. According to the invention, a pickling composition for ferrous metal is provided which comprises a pickling acid such as sulfuric or hydrochloric acid and a small but effective amount of the the composition of this invention, for example at least about 5 p.p.m., such as from about 100 to 5,000 p.p.m., but preferably from about 500 to 1,500 p.p.m.

Ferrous metal articles are pickled by contacting the surface (usually by immersion in the pickling solution) with a pickling composition as described to remove oxide from their surface with minimum dissolution and hydrogen embrittlement thereof and then washing the ferrous metal to remove the pickling composition therefrom.

USE IN ACIDIZING EARTH FORMATIONS

The compositions of this invention can also be used as corrosion inhibitors in acidizing media employed in the treatment of deep wells to reverse the production of petroleum or gas therefrom and more particularly to an improved method of acidizing a calcareous or magnesium oil-bearing formation.

It is well known that production of petroleum or gas from a limestone, dolomite, or other calcareous-magnesian formation can be stimulated by introducing an acid into the producing well and forcing it into the oil or gas bearing formation. The treating acid, commonly a mineral acid such as HCl, is capable of forming water soluble salts upon contact with the formation and is effective to increase the permeability thereof and augment the flow or petroleum to the producing well.

USE AS CORROSION INHIBITORS IN DEEP WELLS

Because of the world wide shortage of petroleum products, deeper wells are now being drilled to tap new petroleum fields. However, increased depth poses more severe corrosion problems. For example as one drills to depths in excess of 10,000 ft., one encounters temperatures in excess of about 200° F., such as from about 200° to 550°, for example from about 250° to 550°, but generally within range of about 300° to 450°; pressures in excess of about 5,000 psi, such as from about 5,000 to 40,000, for example from about 7,500 to 30,000, but generally in the range of about 8,000 to 20,000; and high acidity, particularly that due to $H_2S$, $CO_2$, etc., for example $H_2S$ or $CO_2$ partial pressures of acidic gases in excess of about 10 psi, such as from about 10 to 20,000, for example from about 100 to 10,000, but generally from about 200 to 5,000.

These partial pressures of acidic gases can be obtained by analysis of $H_2S$ or $CO_2$ in the range from a few p.p.m. to 80%, for example from 1,000 p.p.m. to 50%, but generally from 2% to 40%.

Conditions as extreme as these, place great corrosive stress upon the tubing employed in such wells. Thus, when drilling such wells costs in excess of $5–$6 million dollars, approximately half of which is tubing, the importance of effective corrosion inhibition is evident. However, when conventional oil well corrosion inhibitors are employed they are found to be of little or no effectiveness since they tend to degrade, volatilize, polymerize, and either lose effectiveness as corrosion inhibitors or polymerize so as to clog the tubing.

We have further discovered that these compositions are effective as corrosion inhibitors in systems of high temperature, high pressure and high acidity, particularly in deep wells, and most particularly in deep gas wells.

USE AS CHEMICAL CLEANING CORROSION INHIBITORS

The compositions of this invention can also be used as chemical cleaning corrosion inhibitors. Chemical cleaning processes are performed in the chemical process, oil and gas, and utility industries for two purposes: (a) to remove deposits from heat transfer surfaces in order to increase heat transfer efficiency, and (b) to remove deposits from flow ducts (tubing, nozzles, vessels, etc.) in order to maintain high flow capacity hence low pressure drops, which in turn again increases process efficiency.

Deposits to be removed are quite varied in composition. Therefore, a variety of solvents have been developed for the various specific purposes. The most common solvent is hydrochloric acid. It is extremely corrosive, particularly on stressed metal parts and certain high strength, low alloy carbon steels. Mixed metallurgy in the structures to be cleaned calls for solvents which are "inert" with respect to any of the metals. Thus hydrochloric acid cannot be used in presence of stainless steels such as are found in super heaters of utility fossil fuel or nuclear steam generators.

Specific solvents containing chelating agents such as citric acid, EDTA, and other chelating agents ("chelating solvents") have been developed for such installations. These chelating solvents are highly corrosive to carbon steels which may be part of the boiler or the cleaning installation and must therefore contain corrosion inhibitors. The alkylmercapto succinic acids which are subject of this invention, are particularly effective corrosion inhibitors for various carbon steels such as are found in the cleaning equipment (AISI-1018) and boilers (SA-533-A).

The following examples are presented for purposes of illustration and not of limitation.

TABLE A

Corrosion Rates in Inhibited Chelating
Solution and Chemical Cleaning Conditions
(10% EDTA, 1% Hydrazine at a pH 7)

| Ex. | Compound | Temp. °F. | Concentration Wt. % | Corrosion Rate MPY AISI-1018 | Corrosion Rate MPY SA-533-A |
|---|---|---|---|---|---|
| 1 | $CH_3-(CH_2)_7-S-CH(COOH)-CH_2-COOH$ | 200 | 0.5 | 58 | 12 |
| 2 | $CH_3-(CH_2)_{11}-S-CH(COOH)-CH_2-COOH$ | 200 | 0.5 | 61 | 37 |
|   |   | 250 | 0.025 | 307 } Av. 351 |   |
|   |   | 250 | 0.025 | 394 |   |
| 3 | $CH_3-(CH_2)_7-S-CH_2-CH(CH_3)-COOH$ | 250 | 0.5 | 238 | 140 |

The tests were performed in laboratory beakers or autoclaves over a period of 24 hours. The corrosion rates were continuously monitored by the linear polarization technique. The results from this technique were confirmed by weight loss measurements. Each beaker or autoclave contained three corrosion coupons, or electrodes of the type required for the corrosion rate procedures indicated in Table A above.

We claim:

1. A process of inhibiting corrosion which comprises treating a system with a sulfidic sulfur-containing polycarboxylic acid having carboxylic groups attached to adjacent carbons, or a derivative thereof selected from the group consisting of anhydrides, salts, esters, amides, aminoamides, ester amides, polyamides, polyester amides, and cyclic amidines of said carboxylic acid.

2. The process of claim 1 where the polycarboxylic acid is a dicarboxylic acid.

3. The process of claim 2 where the dicarboxylic acid is maleic acid.

4. The process of claim 2 where said sulfidic sulfur-containing dicarboxylic acid or derivative thereof is

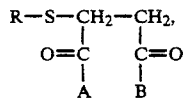

where R is selected from the group consisting of alkyl, aryl, aralkyl, cycloalkyl, and substituted derivatives thereof, and where A and B are —OH, amido, ester, or where A and B are joined to form an anhydride or imino group.

5. The process of claim 4 where R has at least 4 carbons.

6. The process of claim 4 where R has about 6 to 18 carbons.

7. The process of claim 4 where R has about 8 to 12 carbons.

8. The process of claim 4 where R is octyl or dodecyl.

9. The process of claim 9 where at least one group of A and B is OH.

10. The process of claim 9 where both groups of A and B are OH.

11. The process of claim 4 where A and B are one of the following:

(1)
$R_1$
$NR_2$ where $R_1$ and $R_2$ are hydrogen, or alkyl, or a cycloalkyl group, or where A and B are joined to the nitrogen to form a cycloalkyl group;

(2)
XR where X is oxygen or sulfur and R is an alkyl or a cycloalkyl group.

12. The process of claim 9 where the system inhibited is a chemical cleaning solution.

13. The process of claim 10 where the system inhibited is a chemical cleaning solution.

14. The process of claim 11 where the system inhibited is a chemical cleaning solution.

15. The process of claim 11 where the system inhibited is a chemical cleaning solution.

16. The process of claim 15 where the sulfur-containing compound is

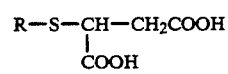

where R is alkyl.

17. The process of claim 16 where the alkyl group has 6–18 carbons.

18. The process of claim 17 where the alkyl group has 7 to 11 carbons.

19. The process of claim 1 where the carboxylic groups are attached to a cyclic ring.

20. The process of claim 19 where the composition has the general formula

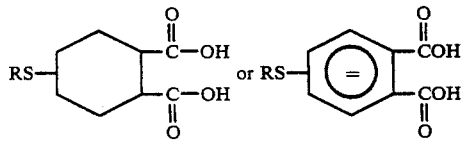

where = indicates ring unsaturation and R is alkyl.

* * * * *

REEXAMINATION CERTIFICATE (686th)
United States Patent [19]
Hausler et al.

[11] B1 4,495,336
[45] Certificate Issued May 19, 1987

[54] MERCAPTO-POLYCARBOXYLIC ACIDS

[75] Inventors: Rudolf H. Hausler; Neil E. S. Thompson, both of St. Louis, Mo.

[73] Assignee: Petrolite Corporation, St. Louis, Mo.

Reexamination Request:
   No. 90/000,952, Feb. 5, 1986

Reexamination Certificate for:
   Patent No.: 4,495,336
   Issued: Jan. 22, 1985
   Appl. No.: 385,351
   Filed: Jun. 7, 1982

[51] Int. Cl.$^4$ .................... C23F 11/04; E21B 43/22
[52] U.S. Cl. ........................... 252/8.555; 252/8.553; 252/391; 252/395; 422/12
[58] Field of Search .......... 252/8.55 E, 395, 8.55 C, 252/391; 422/12

[56] References Cited
U.S. PATENT DOCUMENTS

| | | | |
|---|---|---|---|
| 2,561,673 | 7/1951 | Proell et al. | 260/537 |
| 2,581,514 | 1/1952 | Chilcote | 260/537 |
| 3,762,873 | 10/1973 | Oude Alink | 21/2.7 R |

FOREIGN PATENT DOCUMENTS 889380  2/1962  United Kingdom .

OTHER PUBLICATIONS

Umehara et al., "Yukagaku", vol. 20, No. 7 (1971), pp. 434–437.
Weisstuch et al., Materials Protection and Performance, vol. 10, No. 4, Apr. 1971, pp. 11–15.

Primary Examiner—Herbert B. Guynn

[57] ABSTRACT

This invention relates to a sulfidic process of inhibiting corrosion which comprises heating a system with a sulfur-containing polycarboxylic acid or derivatives thereof having carboxylic groups attached to adjacent carbons.

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claims 9, 10, 15-18 and 20 are cancelled.

Claims 1, 4, 11-13 and 19 are determined to be patentable as amended.

Claims 2, 3, 5-8 and 14, dependent on an amended claim, are determined to be patentable.

New claims 21-26 are added and determined to be patentable.

1. A process of inhibiting corrosion which comprises treating a system with a sulfidic sulfur-containing *derivative of a* polycarboxylic acid [having] *which originally had* carboxylic groups attached to adjacent carbons, [or a] *said* derivative [thereof] *being* selected from the group consisting of anhydrides, [salts,] esters, amides, aminoamides, ester amides, polyamides, polyester amides[,] and cyclic amidines of said carboxylic acid.

4. The process of claim 2 where said sulfidic sulfur-containing dicarboxylic acid [or] derivative [thereof] *is represented by the formula*

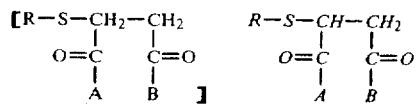

where R is selected from the group consisting of alkyl, aryl, aralkyl, cycloalkyl[,] and substituted derivatives thereof, and where $-C(=O)$A and $-C(=O)$B are [—OH,] amido[,] *or* ester[,] or where A and B are joined to form an anhydride or imino group.

11. The process of claim 4 where A and B are one of the following:

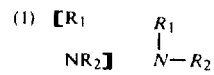

where $R_1$ and $R_2$ are hydrogen, [or] alkyl[,] or a cycloalkyl group, or where A and B are joined to the nitrogen to form a cycloalkyl group;

(2) XR where X is oxygen or sulfur and R is an alkyl or cycloalkyl group.

12. The process of claim [9] *1* where the system inhibited is a chemical cleaning solution.

13. The process of claim [10] *4* where the system inhibited is a chemical cleaning solution.

19. The process of claim 1 where the [carboxylic] *derivative* groups are attached to a cyclic ring.

*21. Process of claim 1 wherein the system treated is an oil well.*

*22. Process of claim 1 wherein the system treated is a gas well.*

*23. Process of claim 1 wherein the system treated is a refinery.*

*24. Process of claim 1 wherein the system treated is a brine system.*

*25. Process of claim 1 wherein the system treated is a secondary oil recovery system.*

*26. Process of claim 1 wherein the system treated is an acidizing system for earth formations.*

* * * * *